F. V. PETERSON.
CLUTCH.
APPLICATION FILED JAN. 27, 1912.
1,125,708.
Patented Jan. 19, 1915.
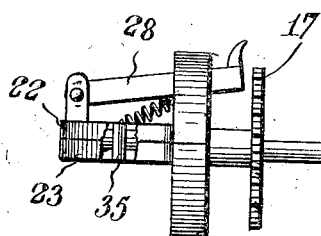
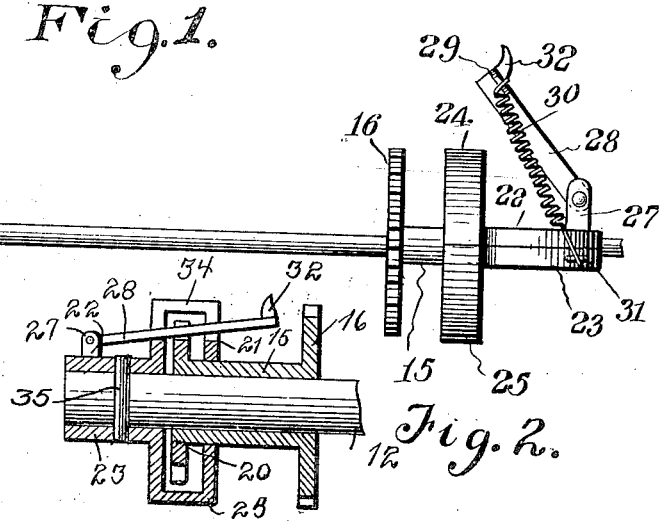
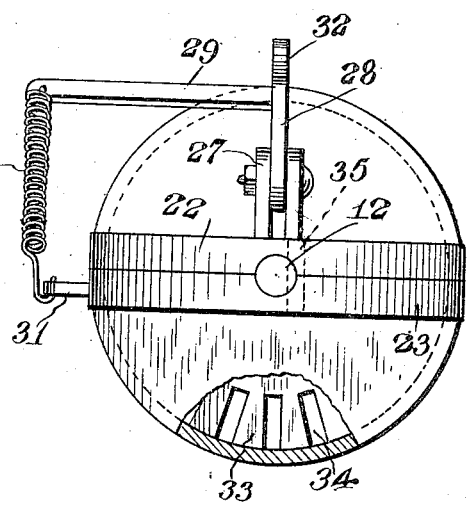
Witnesses
J. P. Walden
Harry M. Test
Inventor
F. V. Peterson.
By Harry Eels Chandlee
Attorney

UNITED STATES PATENT OFFICE.

FRANK V. PETERSON, OF LINDSBORG, KANSAS.

CLUTCH.

1,125,708.　　　Specification of Letters Patent.　　Patented Jan. 19, 1915.

Application filed January 27, 1912.　Serial No. 673,888.

*To all whom it may concern:*

Be it known that I, FRANK V. PETERSON, a citizen of the United States, residing at Lindsborg, in the county of McPherson and State of Kansas, have invented certain new and useful Improvements in Clutches, of which the following is a specification.

This invention relates to improvements in clutches for speed changing gearing and is particularly adapted for planting attachment for listers.

The principal object is to provide a clutch for a speed changing gearing of a planting machine so as to quickly change the speed of the seed planting mechanism, from the driver's seat without the necessity of dismounting from the machine.

Other objects and advantages will be apparent from the following description and with particular reference to the accompanying drawings.

In the drawings: Figure 1 is an elevation of my clutch. Fig. 2 is a partial vertical longitudinal sectional view of the device. Fig. 3 is an end elevation.

Referring particularly to the accompanying drawings, 12 represents a shaft on which my clutch is mounted. Loosely mounted on the end of the shaft 12 is a sleeve 15. Secured on one end of the sleeve 15 is a sprocket wheel 16, which receives its rotary motion, by means of a chain on the axle of the machine (not shown). The end of the sleeve 15 opposite to the sprocket 16 is formed with threads 20 which are adapted to receive the toothed wheel 21, which toothed wheel rotates with the sprocket. On one end of the shaft is secured a casing which is divided into an upper flattened portion 22 and a lower flattened portion 23 which are secured together in any suitable manner, and keyed to the shaft as indicated at 26. The inner ends of the members 22 and 23 carry the halves 24 and 25 of a cylindrical casing. On the upper face of the flattened member 22 are the vertically extending perforated parallel ears 27 between which is pivoted a detent lever or arm 28. Extending laterally at right angles from the free end of the arm or lever 28 is a lug 29 (best seen in Fig. 3) to which is attached one end of a coil spring 30, the other end of said spring being attached to a lug 31 on the flattened member 23. A finger piece 32 extends outwardly from the arm 28 so that the same may be grasped to swing the arm on its pivot. In the upper portion of the section 24 of the cylindrical casing is formed an opening 34, through which the arm 28 is adapted to pass to engage between the teeth of the said wheel 21.

The sprocket 16, and the toothed wheel 21, rotate continuously through the means of the before-mentioned chain, and when the arm 28 is thrown down into the opening 34 to engage between the teeth of the wheel 21, the casing together with the arm 28 rotates with the shaft 12 and drives the shaft. When the arm 28 is thrown out of the opening 34, the sprocket 16 will continue to rotate, but the shaft 12 will remain stationary. In the ordinary use of the device the arm 28 is thrown into the opening 34 so as to cause the rotation of the shaft by means of the sprocket 16. When the lever 28 is disengaged from the opening 34, the sleeve 15 and toothed wheels 16 and 21 rotate idly, but when the lever is thrown so as to pass into the opening 34, the lever will engage between certain of the teeth of the wheel 21 and lock the casing 25 thereto, causing this to rotate with the sleeve, and by reason of the fact that this casing is secured to the shaft, the shaft will be rotated with it. It will of course be understood that the clutch is shifted when the machine is at rest.

From the foregoing it will readily be seen that the lever 28 is easily accessible so that it may be quickly thrown in or out. It will also be noted that the spring 30 is so arranged with respect to the pivot of the lever 28 that the said lever will remain in either limit of its swinging movement, the spring being arranged to exert a pull, on either side of the center of the movement.

What is claimed is:

A clutch comprising an actuating shaft, a sleeve loosely mounted on the shaft, a toothed wheel secured on one end of the sleeve, a driving sprocket carried on the other end of the sleeve, a member secured to the end of the shaft comprising a flattened portion, and a casing inclosing the toothed wheel, a spring-pressed pivoted arm carried by the flattened portion of the member, said casing portion having an opening therein for passage therethrough of the said arm for engagement between the teeth of the toothed wheel.

In testimony whereof I affix my signature, in the presence of two witnesses.

FRANK V. PETERSON.

Witnesses:
J. M. NELSON,
C. A. JOHNSON